Jan. 9, 1962  H. P. HÄBERLIN  3,015,864
DOWEL GUIDE WITH PLASTIC FILLER MATERIAL
Filed June 30, 1959  2 Sheets-Sheet 1

INVENTOR.
HANS PAUL HÄBERLIN

Jan. 9, 1962  H. P. HÄBERLIN  3,015,864
DOWEL GUIDE WITH PLASTIC FILLER MATERIAL
Filed June 30, 1959  2 Sheets-Sheet 2

INVENTOR.
HANS PAUL HÄBERLIN

United States Patent Office 3,015,864
Patented Jan. 9, 1962

3,015,864
DOWEL GUIDE WITH PLASTIC FILLER
MATERIAL
Hans Paul Häberlin, Schaffhausen, Switzerland, assignor to Erwin Buhrer, Schaffhausen, Switzerland
Filed June 30, 1959, Ser. No. 823,966
Claims priority, application Switzerland Aug. 11, 1958
2 Claims. (Cl. 22—110)

The present invention relates to a method of producing a dowel guide and more particularly to a method of producing the dowel guides in moulding flasks.

For centering the moulding flasks by means of dowels guide bushes or sleeves secured in the flasks are commonly employed.

Moulding flasks are known in which the guide sleeves are secured by screwing. These guide sleeves, however, require reworking after insertion to obtain the accuracy necessary for the position of the guide bores.

A further process known is that of forcing the guide bushes into the holes provided in the flasks. This process is unsatisfactory as heating of the moulding flasks when moulds are poured will cause the bushes to work loose. At the same time, the bushes may be deformed during the pressing operation which in turn will result in inaccuracies in the fit of the guide bush. In order to obtain an accurate relative concentric position of two pairs of guide bushes and an accurate axially symmetrical relative position of two guide bushes disposed one above the other, the holes in the moulding flask must be produced by high-precision machines, which is very costly. A further disadvantage attaching to these bushes is that the new bushes used as replacements must be oversize in diameter in order to ensure firm seating in the worn hole in the flask. For replacement, bushes having different outer diameters must therefore be kept in stock. Forcing these bushes into the holes requires costly assembling tools.

All these known moulding flask dowel guides have not come up to expectations and for this reason new production processes and devices have time and again been sought.

It is therefore an object of the present invention to provide for a method of producing dowel guides which will be simple yet give the accuracy required while avoiding costly machining operations and close tolerances.

A further object of the present invention is the provision of a method for the production of dowel guides by which finished guide bushes can be accurately positioned in the mould flask without requiring accuracy and finish the bores for receiving the guide bushes.

Still a further object of the present invention is to provide for the securing of guide bushes in the mould flask in a manner so as to form interengagement between the bush and the flask to avoid working loose of the guide bush in use of the flask.

Another object of the present invention is the provision of means permitting the securing of the dowel bushes in the moulding flask by the expedient of introducing liquid or semi-liquid filler material between the outside of the bushes and the walls of the bores receiving the latter, which will subsequently harden.

These and other objects of the present invention will become better apparent from the following description when taken in connection with the accompanying drawings in which.

Figures 1, 4:
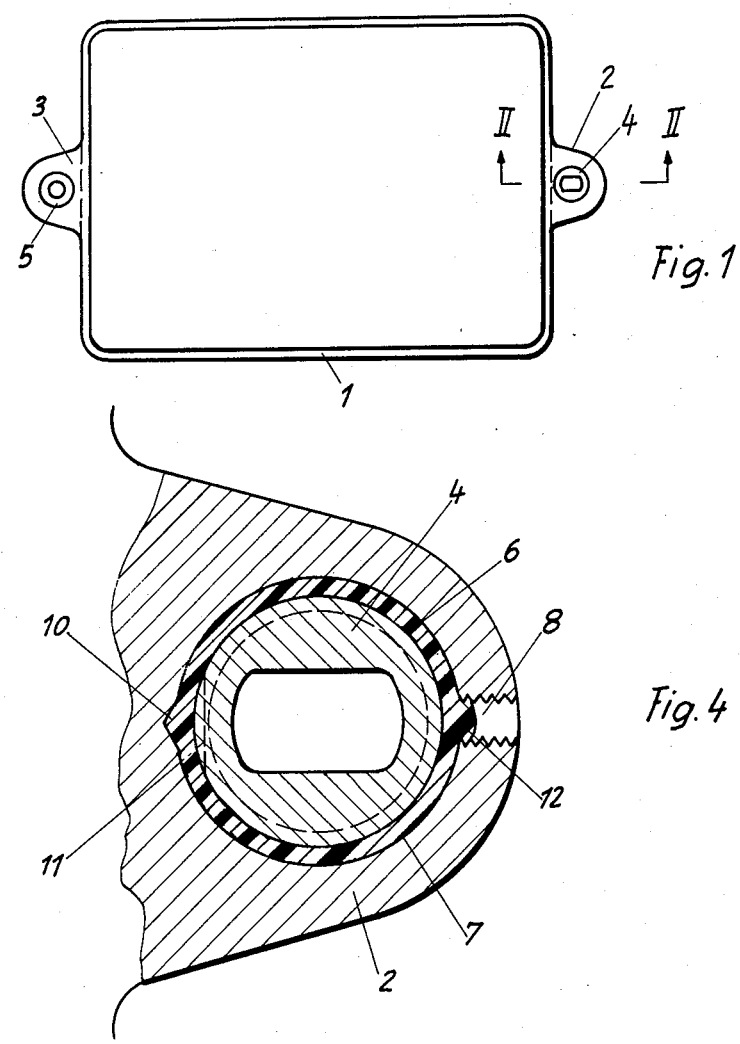
FIG. 1 is a plan view of a moulding flask.
FIG. 4 is a section of a moulding flask tongue along line IV—IV in FIG. 2.

Generally stated it will be seen that the present invention provides for the securing the guide bush in the mould flask by a non-metallic hardening filler which is placed between the guide bush and the hole in the moulding flask accommodating the bush.

It will further be seen that the present invention further provides for a dowel guide comprising a guide bush and a hole accommodating the same in a guide tongue of the moulding flask, the hole being provided with at least one recess, at least one indentation being provided in the circumference of the guide bush in the area of the recess provided in the hole and the space formed by the recess in the hole and that in the bush being filled with a non-metallic hardened filler material.

Referring now more particularly to the drawing it will be noted that a moulding flask 1 is provided with two guide tongue pairs 2, 3 in known manner. Each of these guide tongues accommodates a dowel guide bush 4 and 5, respectively. The guide bushes 4 are provided with an oblong guide bore, the bushes 5, with a circular bore.

Figure 2:
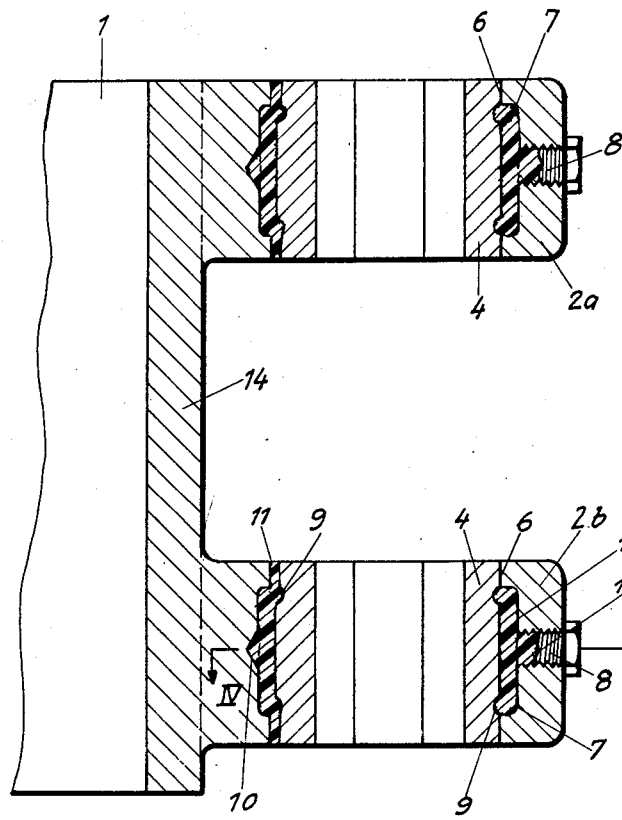
FIG. 2 is a section through a pair of guide tongues of a moulding flask taken along line II—II in FIG. 1, produced in accordance with the invention.

FIG. 2 shows the guide tongues 2 at an enlarged scale, the upper tongue 2a being flush with the top edge of the moulding flask while the second tongue 2b is arranged at the lower portion of the moulding flask wall 14 at some distance downward from the first tongue 2a. The tongues 2 are each equipped with a circular hole 6 designed to accommodate the guide bushes 4. The bore 6 has its middle portion widened, i.e. recessed, so that an annular hollow space 7 in the form of a groove is obtained.

Located at the front face of each of the tongues 2 is a threaded bore 8 opening into space 7. Provided in the wall of the groove 7 nearer the moulding flask wall 14 and opposite bore 8 is a recess in the form of a dimple 10 which may be produced by the core bit for the threaded bore 8. The guide bushes 4 have their circumference provided with two annular grooves 9 arranged in the area of the annular groove 7.

The diameter of the hole 6 is, by way of example, .2 mm. larger than the outer diameter of the guide bushes 4. It will be noted that fitting of the guide bush 4 into the hole 6 requires no accuracy, which enables a substantial saving to be achieved in manufacture. The process disclosed below will secure an accurate relative position of the guide bushes.

Figure 3:
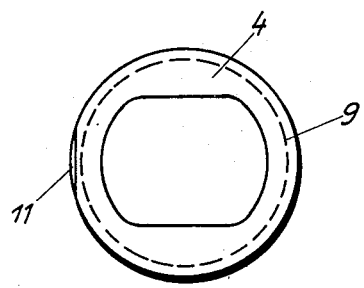
FIG. 3 is a plan view of a guide bush having an oblong guide bore.

When producing the dowel guides, preferably a number of moulding flasks 1 are stacked. However, it is also possible to produce only one moulding flask in this manner. In a device (not shown) the guide bushes are held in the position required, i.e. at the level of a corresponding guide tongue. A centering device which, by way of example, comprises two centering pins, one inserted in the circular bore of the guide bush 5 and one in the oblong bore of the guide bush 4, centers the pairs of guide bushes 4, 5 relative to one another. The guide bushes are fixed, i.e. bonded in this position. This is effected by forcing a non-metallic hardening filler material, e.g. a cold setting synthetic resin, into the space 7 which will hold in position the guide bushes 4 and 5 respectively after removal of the centering and holding devices. For this purpose, a pressing device, such as a screw or lever press as employed for lubricating grease, is screwed into the threaded bore 8. To arrange for venting the space 7 while the resinous material is forced into it, the guide bushes 4, 5 are provided with a flattened area or face portion 11 (FIG. 3) between one of the grooves 9 and the end face. When the resinous material emerges at the flattened area 11, this will indicate that the space 7 and the grooves 9 and the dimple 10 are completely filled with the filler material. The grooves 9 in the guide bushes 4 and 5 and the recesses 13 serve to form interengagement for axial fixation of the bushes. The dimple 10 and the residue 12 of plastic material in the threaded bore 8 secure the filler ring in the space 7 against rotation. Further the flattened area serves to secure the guide bush against rotation relative to the filler ring in space 7 and to the guide tongue 2, respectively.

The filler material employed for securing the guide sleeves may be a cold hardening synthetic resin of the group of epoxy resins.

The recess 13 forming the hollow space 7 could also be replaced by one or several grooves or other recesses. Again, the grooves in the guide bushes could be replaced by transverse bores, indentations, recesses or the like.

The hardening fillers may in particular be materials which display no change in volume or very inconsiderable change on hardening, which can be cast at low temperatures, and which ensure a certain adhesion to metals and good thermal stability.

The guide bushes may when requiring replacement be removed by means of a press. The bead of the filler material located in the grooves 9 will then be sheared off. Since removal by pressing at room temperature requires high pressures, it is advantageous to heat the guide bushes locally by means of a burner. The filler material remaining in the space 7 is scraped out so that the guide tongue is again ready for insertion and bonding a new guide sleeve.

The advantages of the present invention may be summarized as follows:

With the known processes of press fitting guide bushes, the latter are distorted, which increases the final tolerance of the dowel guide. The final tolerance is the product of the manufacturing tolerance of the hole and the effect exercised on the said hole by the deviation of the force fit of the bush. When bonded on the other hand, the guide bush will not become deformed and the final tolerance of the hole therefore remains unchanged. A substantial advantage of the present invention therefore resides in the fact that the final tolerance in the production of guide bushes can be kept within very narrow limits.

Employing a common centering device for all moulding flasks ensures a very accurate rectangularity and axial parallelism of the guide bushes in the various moulding flasks.

When manufacturing the holes 6, no requirements regarding the accuracy of the size and axial position of the holes will arise. The holding and centering device, which must be prepared only once, is the only factor determining the position of the guide bushes. These features enable the manufacturing costs to be substantially lowered. No guide bushes having different diameters are required as spares. The guide bushes are fully secured against axial displacement and rotation.

It will also be realized that due to the fact that the guide bushes may fit in the bores with some play prior to introducing of the filler material, the predetermined distance between the bushes at opposite ends of the flask may be obtained despite slight inaccuracies in the distance of the corresponding bores. Accurate spacing may best be obtained if the bushes on both sides are fitted, i.e. secured by the filler in the same operation.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A dowel guide in moulding flask having a tongue, said tongue having a bore and being provided with a guide bush arranged in said bore, said tongue being provided with at least one recess forming an annular space between said bush and said tongue, said guide bush having at least one indentation provided opposite said recess, said annular space and said indentation being filled with a cold setting resinous, non-resilient hardened epoxy plastic filler material, to prevent displacement of said bush relative to said tongue and to impede removal of said bush from said bore.

2. A dowel guide according to claim 1, said tongue having another bore therein extending normal to and communicating with said annular space for filling said annular space with said filler material, said guide bush having an end face being provided with a flattened area adjacent said end face so that filler material from said annular space will pass between said flattened area and said tongue locking said bush against rotation while indicating that said annular space is filled with said filler material.

References Cited in the file of this patent

UNITED STATES PATENTS

| | | |
|---|---|---|
| 561,190 | Withers | June 2, 1896 |
| 925,686 | Danver et al. | June 22, 1909 |
| 1,599,379 | Freeman | Sept. 7, 1926 |
| 1,743,492 | Sipe | June 14, 1930 |
| 2,677,160 | Peterson | May 4, 1954 |
| 2,808,630 | Ernst et al. | Oct. 8, 1957 |

OTHER REFERENCES

Edwin W. Doe, Foundry Work, John Wiley & Son, page 10, 1951.

Foundry Work, American Technical Society, pages 9 and 10, 1943.

Irving Skeist, Epoxy Resins, Reinhold Publishing Co., pp. 107–179 (1958).

H. Lee & K. Neville, Epoxy Resins, McGraw-Hill Book Co., pp. 183–212, 1957.